Tsunetaro Ohta,
INVENTOR.

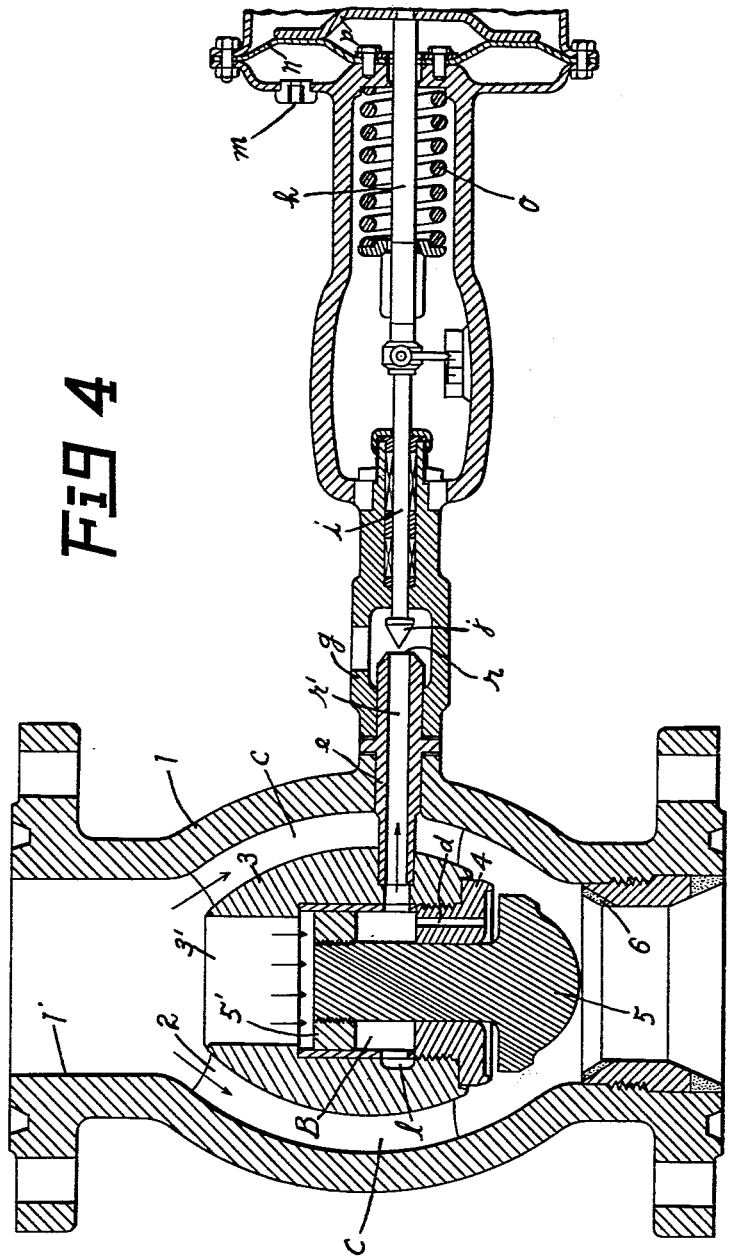

United States Patent Office 3,134,394
Patented May 26, 1964

3,134,394
CHECK VALVES
Tsunetaro Ohta, 358 2-chome, Koshienguchi,
Nishinomiya-shi, Japan
Filed May 29, 1962, Ser. No. 198,603
5 Claims. (Cl. 137—220)

This invention relates to a check valve of the so-called lift type in which the impact resulting from the opening or closing movement is minimized by the cushioning action of the fluid and at the same time the rate of the opening or closing movement is accelerated by the pressure of the fluid itself and in which the speed of this movement together with the cushioning action can be controlled from outside the valve casing.

The principal object of the present invention is, at the beginning of the opening stroke, to aid the valve body in its upward movement by applying pressure to the piston in the opening direction and in addition to enable the opening operation to be carried out more rapidly and satisfactorily by decreasing the pressure above the piston, consequently increasing the net lifting force on the valve body.

The second object of this invention, is prior to the end of the opening stroke, to minimize the impact produced between the back surface of the valve body and the valve casing surface opposed thereto.

The third object is, when the flow through the valve is reversed, to increase the rate of the downward movement by drawing the fluid under the piston into the fluid flowing through several small holes by the partial pressure drop produced at the lower outside ends of the holes in order to decrease the pressure of the fluid under the piston.

The fourth object is, when the flow through the valve is reversed, to minimize the shock produced between the valve body and valve seat.

The fifth object is to achieve control with ease and freedom from the outside to control the cushioning action of the fluid on the impact produced between the valve body and valve seat at the end of the closing stroke.

A preferred embodiment of this invention will be shown in the accompanying drawings, in which:

FIG. 4 is a sectional view of a valve connected with a power unit such as a pneumatic diaphragm valve for regulating the cushioning action at the end of the closing stroke.

Figure 1:
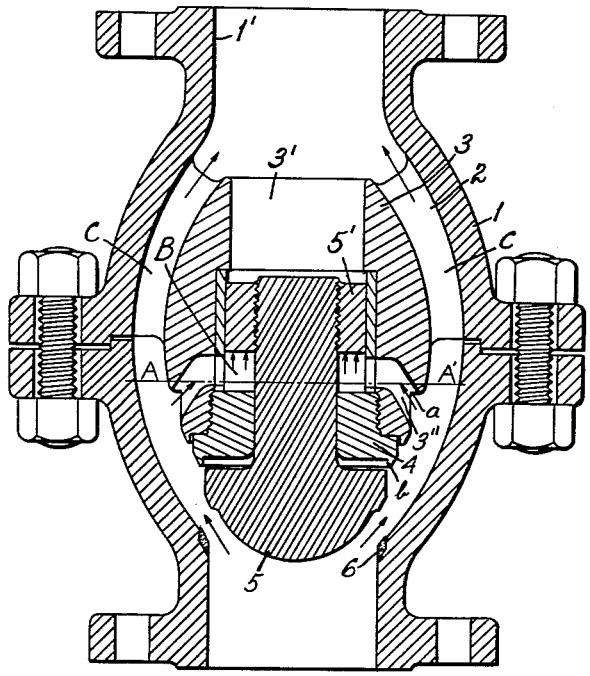
FIG. 1 shows a longitudinal section of a check valve prior to the end of the opening stroke.
Figure 2:
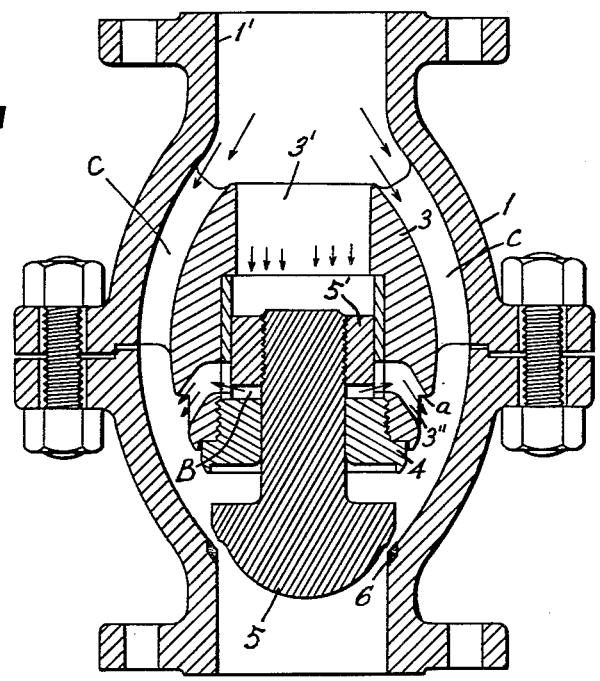
FIG. 2 shows a longitudinal section prior to the end of the closing stroke.
Figure 3:
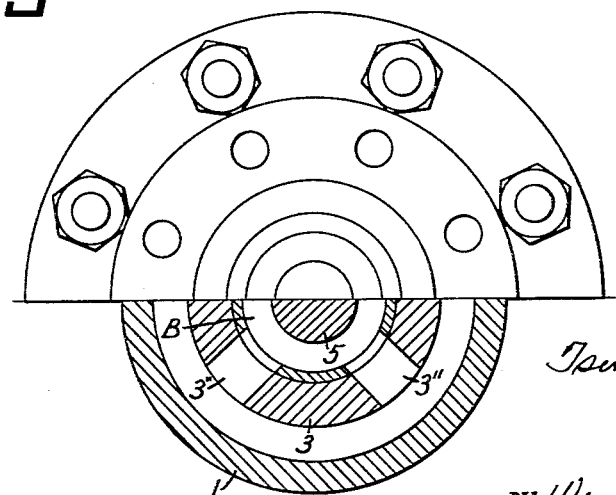
FIG. 3 is a cross-sectional view taken on the line A—A' of FIG. 1.

In the prior art check valves, a rather large shock has been produced at the contacting surfaces at the end of the opening or closing stroke, resulting in relatively great damage to the valve; moreover the action of the downward movement, especially at reversal of flow, has been very unstable and furthermore too sluggish to meet the demand of emergency closing.

On the other hand, in accordance with this invention, such a valve is so constructed that at reversal of flow, the internal pressure in the chamber under the piston can be regulated by a suitable power unit such as a pneumatic diaphragm valve or magnet valve, thereby increasing the rate of the downward movement. At the same time the cushioning action of the fluid can also be freely controlled by the same power unit. It must be emphasized that it is the purpose of the valve of this invention to speed up the rate of upward or downward movement, during the opening or closing stroke, by applying to the valve body the velocity head as well as the static pressure acting on the valve body and simultaneously by applying to the piston attached to the valve body the like pressure dependent upon the pressure of the fluid. In addition, it is also the purpose of this valve to reduce to a minimum any impact produced between the face of the valve body or piston and the opposed surface by keeping the fluid in the chamber formed between the opposed faces for a short time, and thereby causing the fluid to serve as a cushion or a buffer.

Referring now to the drawings for a better understanding of the invention, a main housing 1 of a valve has a guide body 3 suspended in the center thereof and connected to the housing by a set of webs 2 extending across a clearance or passage C shaped for the smooth flow of the fluid. The guide body has a surface the same shape as the inner surface 1' of the main housing, and is provided with an axial hole 3' therethrough consisting of three parts having different diameters, and a plurality of small bores 3" branching off radially from the middle part of the center hole and inclined outwardly and downwardly and finally opening into the clearance C. The guide body 3 is undercut at $a$ where the extremities of the small bores 3" open into clearance C. A guide bushing 4 is firmly threaded into the lower part of the bore 3' and extends into the middle part of bore 3' and a downwardly projecting annular edge $b$ on its lower face along the periphery thereof defining a recess with the bottom of bushing 4. The spindle end of a valve body 5 is tightly threaded into a piston 5', which is exposed to the pressure of the fluid on both its top and bottom faces and together with the valve body is freely slidable in the guide bushing 4, which is fitted in the middle part of the bore 3'. Furthermore, the piston is so designed that at the end of the closing stroke, or when the bottom face of the valve body 5 just contacts the valve seat 6 provided in the main housing, the relative position of the bottom face of the piston 5' is slightly lower than the parts of the small bores 3' in the guide vessel which are nearest to the top face of the bushing 4; and at the end of the opening stroke, the relative position of the bottom face of the piston is slightly above that of the small bores.

Now referring to FIG. 4, the bushing 4 has a small hole $d$ extending through the bushing parallel to the direction of the piston movement near the outer periphery of bushing 4.

The guide body 3 is also provided with a small annular recess $l$ around the bore 3', from which a small hole extends transversely through the guide body and main housing. A discharge tube $e$ is fitted in this small hole, and extends into a valve box $g$. The valve box $g$ is a control element for regulating the flow of fluid and has connected thereto a drive means of a power unit.

A valve rod $i$ constituting a part of the drive means is provided at one end with a conical head $j$ of slightly larger diameter than the inside diameter of the discharge tube $e$ and is freely movable in valve box $g$ toward and away from the mouth $r$ of tube $e$ to open or close the mouth $r$ of the tube for regulating the flow during the piston movement. This drive means is coupled with a power unit such as a pneumatic diaphragm valve or magnet valve for furnishing power for operating the control element.

In the operation of the valve according to this invention, when the bottom surface of valve body 5 is exposed to the static pressure as well as the velocity head of the fluid, the valve body 5 begins to rise together with the piston 5', and the fluid flows from the clearance between the valve body 5 and valve seat 6 into the passage provided between the housing 1 and guide body 3 and finally flows out of the upper end of housing 1.

In this case, some of the fluid flows against the undercut $a$ at the ends of bores 3" the guide body 3 and advancing through the small bores 3" into the chamber B formed between the piston 5' and bushing 4, while at the same time the piston or valve body keeps rising, and thus the volume of the chamber becomes larger and larger.

This increase in the volume brings about a pressure rise dependent on the velocity head of the fluid and thereby causes the valve body 5 to move upward much more rapidly and easily. The upper portion of the bore 3' in the guide body, although it opens upwardly into the passage through the valve housing, has an air pocket formed therein during the upward stroke, due to the flow direction of the fluid, and the internal pressure in this portion is suddenly dropped as the fluid flows upward, thereby accelerating the rate of upward movement of the piston 5' along with the valve body 5.

As the upward movement comes to an end, the back face of the valve body 5 is pushed into the downwardly opening recess on the bottom of the bushing 4 and the valve body finishes the upward stroke on the contact with the bottom face of the bushing.

Now it must be noted here that the outside diameter of the back face of the valve body 5 is made nearly equal to, or slightly smaller than the inside diameter of the annular projection b forming a recess on the face of bushing 4. Because of this design, when the valve body 5 completely enters the recess, the fluid is kept in the recess and its escape is substantially completely cut off except for the smalle bore d through which the trapped fluid can bleed off. Thus, as the valve body moves upward, the load or resistance on the back face of the valve body grows larger, aided by the cooperation with inactive flow in the passage. This increase in pressure causes the fluid to serve as a buffer, thereby reducing to a minimum any shock produced by the valve body striking the bushing 4.

In case there is reversal of the flow for some reason during the period the valve is open, the fluid pressure is first applied to the top face of the piston 5', then the piston begins its downward movement along with the valve body 5.

In this case, the fluid left in small bores 3" is sucked into the passage C due to the partial drop in pressure at the ends of the bores. This pressure drop is caused by the fact that the ends of the bores are opened into the passage in nearly same direction as the downward flow of fluid at reversal of flow.

At the same time, the fluid kept in the chamber B, under the piston is also discharged into the passage through small bores, thereby producing a pressure drop in the chamber and eventually accelerating the descending movement of the piston and valve body.

Just before this descending movement ends, or when the bottom face of the piston passes across the ends of the small bores 3", the area of the opening of these holes into the chamber B becomes gradually smaller and finally the ends of the bores 3" are blocked completely. Thus, the decreasing area of the ends of these bores acts to block escape of fluid and therefore produces a cushion of fluid preventing any shock resulting from sudden contact of the valve body 5 with valve seat 6.

Referring again to FIG. 4, when the conical head j on the valve rod i of the drive means moves away from and opens the mouth of discharge tube e in the valve box g of the control element, and the velocity head and static pressure of the fluid are applied to the valve body 5, then, the valve body 5 and piston 5' start to rise and the main stream of the fluid flows upward through the passage along and past the guide body. However, some of the fluid will flow into the chamber B between the bushing 4 and piston 5' through the hole d in the bushing and fill the chamber gradually. A part of the fluid in this chamber can flow out of the main housing into the valve box g from the annular recess l, passing through the inside r' of discharge tube 3, and flowing out of the tube mouth 4 into the valve box. Of course, most of the fluid acts as a drive force for raising the valve body.

Referring again to FIG. 4, if air pressure is applied to one side of a diaphragm n by introducing a quantity of air at air inlet m into a pneumatic diaphragm valve of a power unit, diaphragm n is first deformed by the air pressure, guide plate p (which is usually in contact with diaphragm), and is then pushed away by means of a compression spring a and followed by push rod h, which is fixed to the guide plate, and valve rod i which is coupled to the push rod. This shift to the rightward as seen in FIG. 4 moves valve head j away from the discharge tube e, and permits increased discharge of fluid from the check valve. This increase in discharge brings about a sudden drop in the internal pressure in the chamber B under the piston and the downward movement of the valve body can be accelerated.

Even though under such conditions, the fluid keeps entering the chamber B through the hole d in the bushing 4, the impact produced at the end of the closing stroke between the valve body 5 and valve seat 6 can be greatly reduced by the cushioning action of the fluid enclosed in the chamber B.

Furthermore, this cushioning action can be regulated easily and freely by merely controlling the opening of the discharge tube from the outside.

It is thought that the invention and it advantages will be understood from the foregoing description and it is apparent that various changes may be made in the form, construction and arrangement of the parts without departing from the spirit and scope of the invention or sacrificing its material advantages, the form herein before described and illustrated being merely a preferred embodiment thereof.

What I claim:

1. A check valve, comprising a valve casing having an inlet and an outlet, a guide body mounted in said casing and spaced from the inside walls of the casing to leave a flow passage through the casing from the inlet around the guide body to the outlet, said guide body having an axial hole therethrough having at least two portions with different diameters, the portion with the larger diameter being adjacent the outlet of the valve casing, and said guide body having a plurality of small bores extending radially from the larger part of the axial bore into the flow passage and having at least the ends thereof inclined toward the inlet of said valve casing, said small bores opening out of said axial bore a short distance above the portion of the axial bore having the smaller diameter, a valve seat around said inlet to said valve casing, and a valve body cooperable with said valve seat and having a stem thereon extending through said smaller diameter portion of said axial bore and having a piston on the end thereof slidable in the larger diameter portion of said axial bore, said guide body having a recess on the end thereof adjacent said valve casing inlet having a diameter only slightly larger than the diameter of said valve body and into which said valve body fits in piston-cylinder relationship, and said guide body further having a flow restricting bore between the said last-mentioned recess and the larger diameter portion of said axial bore.

2. A check valve as claimed in claim 1 in which said guide body has an undercut portion around the periphery thereof into which said small bores open.

3. A check valve as claimed in claim 1 in which said guide body has an annular recess around the inner end of said larger portion of said axial bore, and a discharge tube extending from said annular recess through said guide body and said valve casing, a valve box on the end of said discharge tube, a valve member in said valve box and cooperable with the end of said discharge tube to control flow of fluid through said discharge tube, and a power unit to which the valve member in said valve box is connected for driving said valve member.

4. A check valve, comprising a valve casing having an inlet and an outlet, a guide body mounted in said casing and spaced from the inside walls of the casing to leave a flow passage through the casing from the inlet around the guide body to the outlet, said guide body having an axial hole therethrough having at least two portions with different diameters, the portion with the larger diameter being adjacent the outlet of the valve casing, and said guide body having a plurality of small bores extending radially from the larger part of the axial bore into the flow passage and having at least the ends thereof inclined toward the inlet of said valve casing, a valve seat around said inlet to said valve casing, and a valve body cooperable with said valve seat and having a stem thereon extending through said smaller diameter portion of said axial bore and having a piston on the end thereof slidable in the larger diameter portion of said axial bore, said guide body having a recess on the end thereof adjacent said valve casing inlet having a diameter only slightly larger than the diameter of said valve body and into which said valve body fits in piston-cylinder relationship, and said guide body further having a flow restricting bore between the said last-mentioned recess and the larger diameter portion of said axial bore.

5. A check valve, comprising a valve casing having an inlet and an outlet, a guide body mounted in said casing and spaced from the inside walls of the casing to leave a flow passage through the casing from the inlet around the guide body to the outlet, said guide body having an axial hole therethrough having at least two portions with different diameters, the portion with the larger diameter being adjacent the outlet of the valve casing, and said guide body having a plurality of small bores extending radially from the larger part of the axial bore into the flow passage and having at least the ends thereof inclined toward the inlet of said valve casing, said small bores opening out of said axial bore a short distance above the portion of the axial bore having the smaller diameter, a valve seat around said inlet to said valve casing, and a valve body cooperable with said valve seat and having a stem thereon extending through said smaller diameter portion of said axial bore and having a piston on the end thereof slidable in the larger diameter portion of said axial bore, and said guide body having a flow restricting bore between the end thereof adjacent said valve casing inlet and the larger diameter portion of said axial bore.

References Cited in the file of this patent

UNITED STATES PATENTS

| | | |
|---|---|---|
| 574,295 | Wyndham et al. | Dec. 29, 1896 |
| 931,532 | Wainwright | Aug. 17, 1909 |
| 2,577,851 | Hribar | Dec. 11, 1951 |

FOREIGN PATENTS

| | | |
|---|---|---|
| 934,922 | Germany | Nov. 10, 1955 |